United States Patent [19]
Fujii

[11] Patent Number: 6,149,175
[45] Date of Patent: Nov. 21, 2000

[54] BICYCLE SUSPENSION

[75] Inventor: Kazuhiro Fujii, Sakai, Japan

[73] Assignee: Shimano Inc., Osaka, Japan

[21] Appl. No.: 09/215,315

[22] Filed: Dec. 18, 1998

[51] Int. Cl.$^7$ .................................................. B62K 3/02
[52] U.S. Cl. ........................... 280/284; 267/132; 280/288
[58] Field of Search .................... 280/275, 283, 280/284, 288; 267/276, 131, 132, 282

[56] References Cited

U.S. PATENT DOCUMENTS

| | | | |
|---|---|---|---|
| 1,071,892 | 9/1913 | Diepenhorst et al. | 280/281.1 |
| 1,257,761 | 1/1918 | Strand | 280/281.1 |
| 2,216,455 | 10/1940 | Piron | 267/282 |
| 3,113,769 | 12/1963 | Pryale | 267/282 |
| 3,942,821 | 3/1976 | Bock | 280/277 |
| 4,475,722 | 10/1984 | Paton et al. | 267/9 |
| 4,796,862 | 1/1989 | Peppel | 254/277 |
| 5,121,937 | 6/1992 | Lawwill | 280/284 |
| 5,205,572 | 4/1993 | Buell et al. | 280/284 |
| 5,217,241 | 6/1993 | Girvin | 280/284 |
| 5,226,674 | 7/1993 | Buell et al. | 280/284 |
| 5,244,224 | 9/1993 | Busby | 280/284 |
| 5,259,636 | 11/1993 | Morales | 280/281.1 |
| 5,259,637 | 11/1993 | Busby | 280/284 |
| 5,284,354 | 2/1994 | McWethy | 280/284 |
| 5,306,036 | 4/1994 | Busby | 280/284 |
| 5,316,327 | 5/1994 | Bell | 280/260 |
| 5,332,246 | 7/1994 | Buell | 280/284 |
| 5,354,085 | 10/1994 | Gally | 280/285 |
| 5,370,411 | 12/1994 | Takamiya et al. | 280/284 |
| 5,385,361 | 1/1995 | De Bei | 280/284 |
| 5,409,249 | 4/1995 | Busby | 280/284 |
| 5,441,292 | 8/1995 | Busby | 280/284 |
| 5,452,910 | 9/1995 | Harris | 280/284 |
| 5,460,396 | 10/1995 | Sutter et al. | 280/284 |
| 5,474,318 | 12/1995 | Castellano | 280/284 |
| 5,498,013 | 3/1996 | Hwang | 280/283 |
| 5,509,679 | 4/1996 | Leitner | 280/284 |
| 5,570,896 | 11/1996 | Collins | 280/284 |
| 5,593,168 | 1/1997 | Chou | 280/275 |
| 5,611,557 | 3/1997 | Farris et al. | 280/275 |
| 5,997,022 | 12/1999 | Matsui | 280/284 |

FOREIGN PATENT DOCUMENTS

| | | | |
|---|---|---|---|
| 302878 | 4/1997 | China . | |
| 70060 | 10/1941 | Czech Rep. | 180/283 |
| 0404530 | 12/1990 | European Pat. Off. . | |
| 559615 | 9/1923 | France . | |
| 723467 | 4/1932 | France . | |
| 1061547 | 4/1954 | France . | |
| 175976 | 10/1906 | Germany . | |
| 4233596 | 7/1994 | Germany . | |
| 414870 | 12/1946 | Italy . | |
| 424000 | 12/1946 | Italy | 280/284 |
| 8253188 | 10/1996 | Japan . | |
| 8258781 | 10/1996 | Japan . | |
| 9109973 | 4/1997 | Japan . | |
| 9109974 | 4/1997 | Japan . | |
| 9290790 | 11/1997 | Japan . | |

*Primary Examiner*—Kevin Hurley
*Assistant Examiner*—Andrew J. Fischer
*Attorney, Agent, or Firm*—Shinjyu Global IP Counselors, LLP

[57] ABSTRACT

A suspension assembly for a bicycle frame which elastically supports a rear frame member, which in turn rotatably supports the rear wheel. The suspension assembly is positioned around the bottom bracket such that the rear frame member pivots about the axis of the bicycle crank axle of the bottom bracket. This arrangement allows the rear wheel and rear frame member to move relative to the main frame, without any adverse affects to the drive train assembly. In the preferred embodiments, drive train assembly can be either a chain drive or a shaft drive. The suspension assembly includes an inner suspension member with the crank axle mounted therein, an intermediate suspension member surrounding the inner suspension member with at least one shock-absorbing element interposed therebetween, and an outer suspension member surrounding the intermediate suspension member with at least one shock-absorbing element interposed therebetween. In the preferred embodiment, each of the shock-absorbing elements includes a plurality of biasing members.

49 Claims, 7 Drawing Sheets

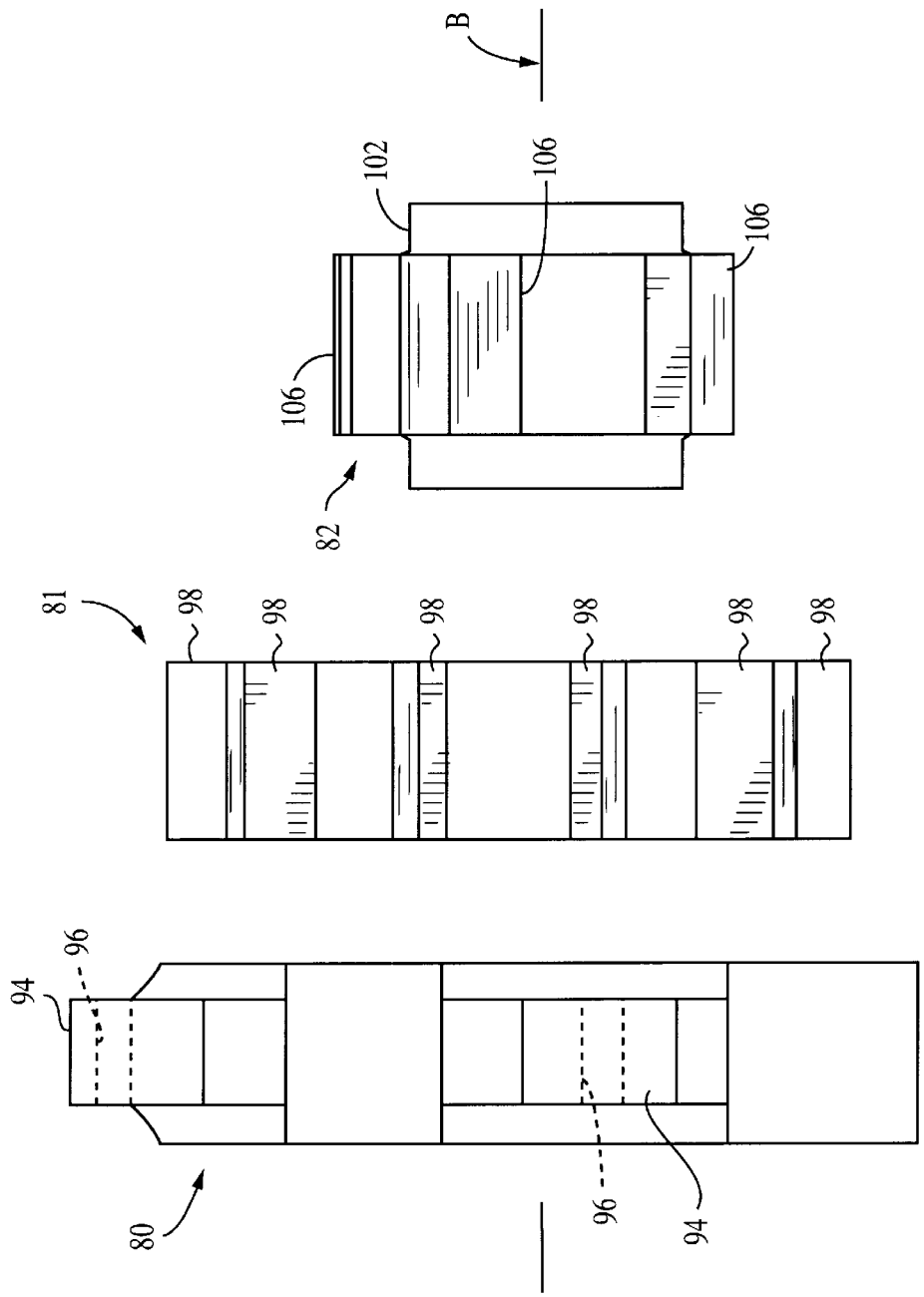

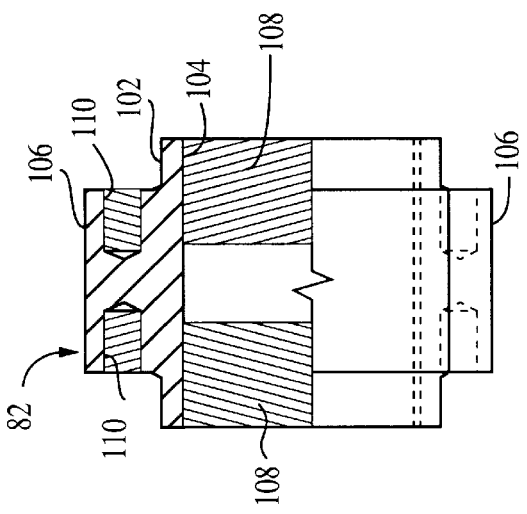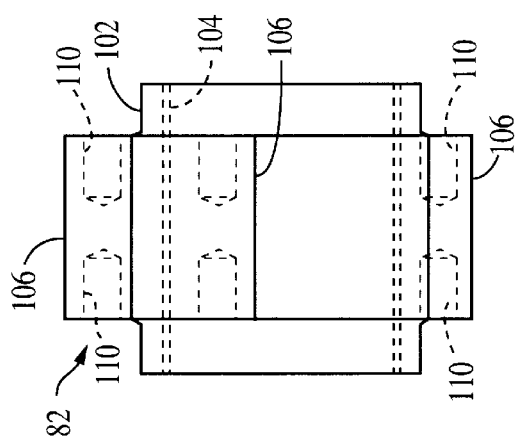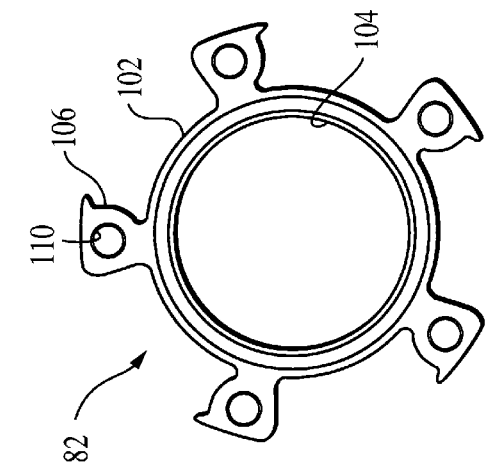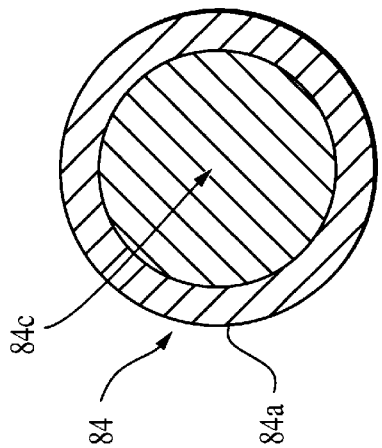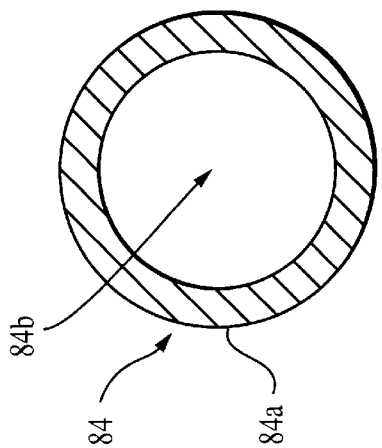

BICYCLE SUSPENSION

CROSS-REFERENCE TO RELATED APPLICATION

This application is related to U.S. patent application Ser. No. 08/887,306, filed Jul. 2, 1997. The entire disclosure of U.S. patent application is hereby incorporated herein by reference.

BACKGROUND OF THE INVENTION

1. Field of the Invention

This invention generally relates to bicycle suspensions. More specifically, the present invention relates to a bicycle suspension for elastically coupling a first frame member to a second frame member. The suspension assembly can be either a rear suspension assembly, a seat suspension assembly or a handlebar suspension assembly. In a rear suspension assembly, the rear frame member is elastically coupled to the main frame member such that the rear frame member pivots about the bottom bracket.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. In the past, most bicycles had rigid frames, which typically transmitted the shocks resulting from rough riding surfaces directly to the rider. In other words, most bicycles were not provided with any type of suspension.

Recently, bicycles, especially mountain bikes (MTB) and all terrain bikes (ATB), have been outfitted with front and/or rear suspension assemblies to absorb the shocks transmitted to the rider when riding on a rough road. Moreover, handlebars and seats are now also being provided with suspensions. These suspension assemblies range from very simple to very complex. However, these prior art suspension assemblies have many drawbacks to them. For example, some of the prior suspension assemblies are expensive to manufacture and/or difficult to assemble. Some prior art suspension assemblies require constant adjustments. Other suspension assemblies have adverse affects on the drive train.

Examples of some prior art bicycles utilizing rear suspension assemblies are disclosed in the following U.S. Pat. Nos.: 3,942,821 to Bock; 5,121,937 to Lawwill; 5,205,572 to Buell et al.; 5,217,241 to Girvin; 5,226,674 to Buell et al.; 5,244,224 to Busby; 5,259,637 to Busby; 5,284,354 to McWethy; 5,306,036 to Busby; 5,316,327 to Bell; 5,332,246 to Buell; 5,354,085 to Gally; 5,370,411 to Takamiya et al.; 5,385,361 to De Bei; 5,409,249 to Busby; 5,460,396 to Sutter et al.; 5,474,318 to Castellano; 5,498,013 to Hwang; 5,570,896 to Collins; and 5,611,557 to Farris et al.

In view of the above, there exists a need for bicycle suspension which overcomes the above mentioned problems in the prior art. This invention addresses this need in the prior art as well as other needs, which will become apparent to those skilled in the art from this disclosure.

SUMMARY OF THE INVENTION

One object of the present invention is to provide a bicycle suspension assembly that has a long stroke for the wheel.

Another object of the present invention is to provide a bicycle suspension assembly that has a relatively low spring constant.

Yet another object of the present invention is to lengthen the stroke (e.g., make the spring constant smaller) without increasing the compression rate of the shock-absorbing elements.

Another object of the present invention is to provide a bicycle suspension assembly that pivotally supports the rear wheel of the bicycle for pivotal movement about the bottom bracket.

Another object of the present invention is to provide a bicycle suspension assembly that is relatively inexpensive to manufacture.

Still another object of the present invention is to provide a bicycle frame with a suspension assembly that elastically supports the handlebar relative to the handlebar stem.

Still another object of the present invention is to provide a bicycle frame with a suspension assembly that elastically supports the rear wheel relative to the bicycle frame.

The foregoing objects can basically be attained by providing a bicycle suspension assembly, comprising a first suspension member, a second suspension member, an intermediate suspension member, a first shock-absorbing element, and a second shock-absorbing element. The bicycle suspension assembly is adapted to be coupled between a first bicycle frame member and a second bicycle frame member. The first suspension member has a first frame connection adapted to be fixedly coupled to the second first frame member. The second suspension member has a second frame connection adapted to be fixedly coupled to the second bicycle frame member for movement therewith about a pivot axis and movably coupled to the first suspension member for relative rotational movement about the pivot axis. The second suspension member has a bore sized to receive the first suspension member therein. The intermediate suspension member is movably positioned in the bore between the first and second suspension members for relative movement. The first shock-absorbing element is coupled between the first suspension member and the intermediate suspension member to bias the second suspension member about the pivot axis from a first shock-absorbing position in which the first shock-absorbing element is substantially elastically deformed and a first rest position in which the first shock-absorbing element is in relative equilibrium. The second shock-absorbing element is coupled between the second suspension member and the intermediate suspension member to bias the second suspension member about the pivot axis from a second shock-absorbing position in which the second shock-absorbing element is substantially elastically deformed and a second rest position in which the second shock-absorbing element is in relative equilibrium.

The suspension assembly of the present invention can be a rear suspension assembly, a seat suspension assembly or a handlebar suspension assembly. In fact, suspension assembly of the present invention can be utilized between any two frame members as needed and/or desired.

The foregoing objects can further be attained by providing a bicycle suspension assembly, comprising a first suspension member, a second suspension member, an intermediate suspension member, a first shock-absorbing element, and a second shock-absorbing element. The first suspension member has a first frame connection that is coupled to a first bicycle frame member. The second suspension member is movably coupled to the first suspension member for relative pivotal movement about a pivot axis. The second suspension member has a second frame connection to fixedly couple a second bicycle frame member thereto and a bore sized to receive a bicycle crank axle therein such that the bicycle crank axle has its axis of rotation substantially coincident with the pivot axis. The intermediate suspension member is movably positioned between the first and second suspension members for relative movement. The first shock-absorbing element is coupled between the first suspension member and the intermediate suspension member to bias the second suspension member from a first shock-absorbing position in which the first shock-absorbing element is substantially elastically deformed and a first rest position in which the first shock-absorbing element is in relative equilibrium. The second shock-absorbing element is coupled between the second suspension member and the intermediate suspension member to bias the second suspension member from a second shock-absorbing position in which the second shock-absorbing element is substantially elastically deformed and a second rest position in which the second shock-absorbing element is in relative equilibrium.

The foregoing objects can basically be attained by providing a bicycle frame, comprising a first and second bicycle frame members with a bicycle suspension assembly coupled therebetween. The bicycle suspension assembly can be constructed as mentioned above.

These and other objects, features, aspects and advantages of the present invention will become readily apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 5 is an exploded front elevational view of the suspension assembly illustrated in FIG. 3;

FIG. 8 is a side elevational view of the inner suspension member for the suspension assembly illustrated in FIGS. 1–5;

FIG. 9 is a right end elevational view of the inner suspension member illustrated in FIG. 8 for the suspension assembly illustrated in FIGS. 1–5;

FIG. 10 is a partial cross-sectional view of the inner suspension member illustrated in FIGS. 8 and 9 for the suspension assembly illustrated in FIGS. 1–5;

FIG. 11 is a cross-sectional view of one of the shock-absorbing elements in accordance with one construction of the present invention; and FIG. 12 is a cross-sectional view of one of the shock-absorbing elements in accordance with another construction of the present invention.

DETAILED DESCRIPTION OF THE PREFERRED EMBODIMENTS

Figure 1:
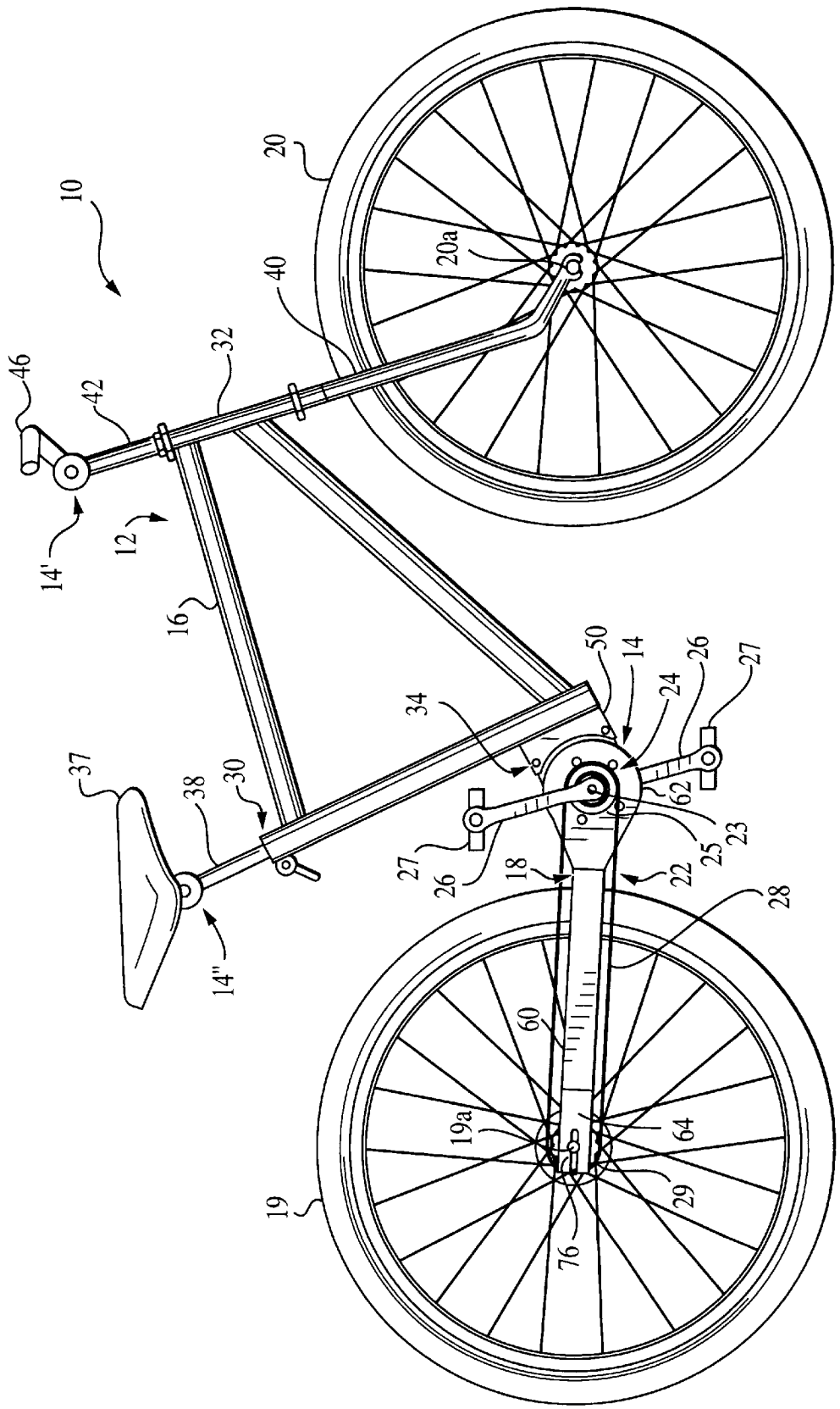
FIG. 1 is a side elevational view of a bicycle in accordance with the present invention, which incorporates a rear suspension assembly and a handlebar suspension assembly of the present invention.
Figure 2:
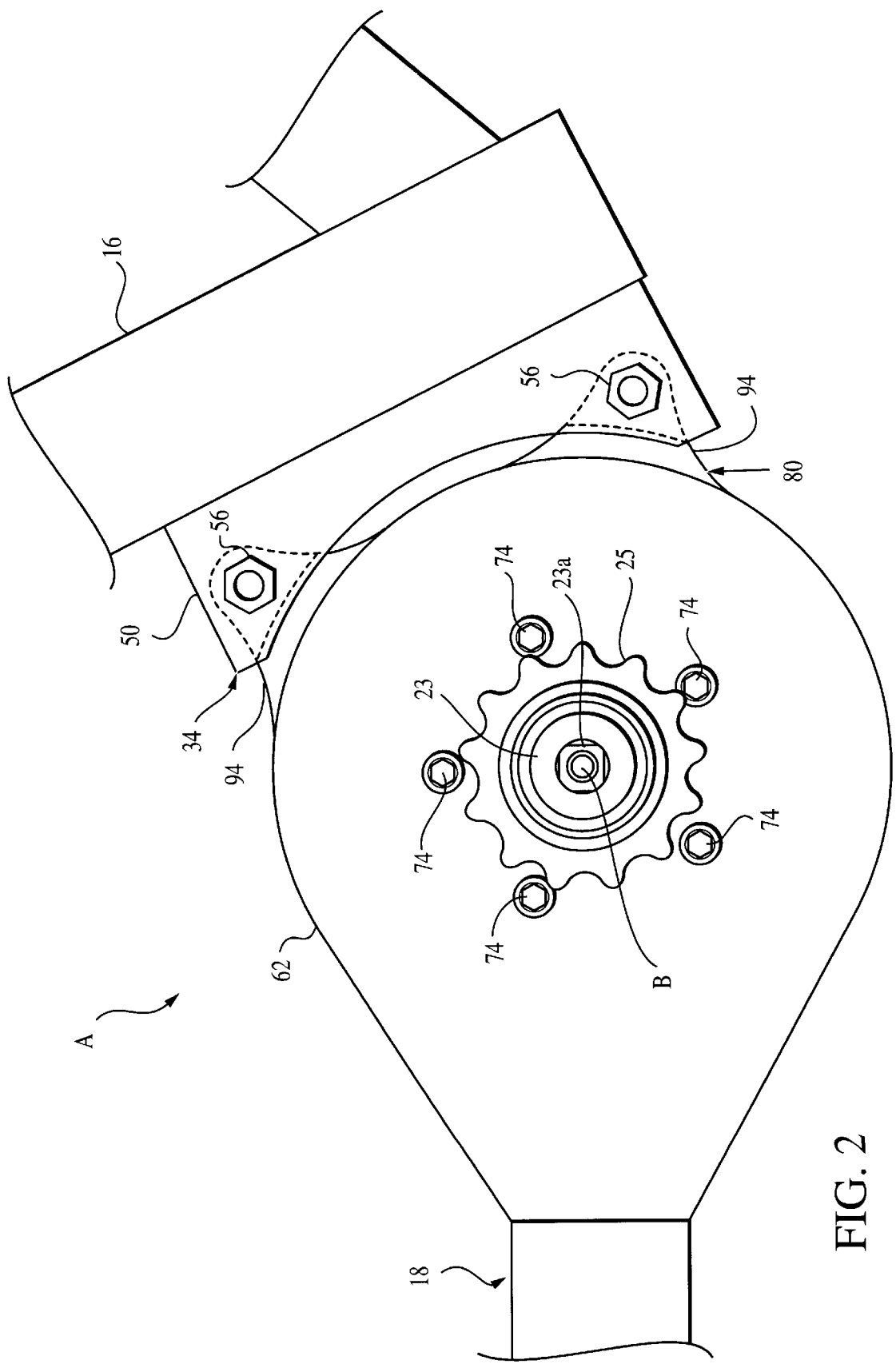
FIG. 2 is an enlarged, partial side elevational view of the bicycle frame illustrated in FIG. 1, illustrating the interconnection between the main frame member and the rear frame member.

Referring initially to FIGS. 1 and 2, a bicycle 10 is illustrated, which has a frame 12 with a rear suspension assembly 14 and a handlebar suspension assembly 14' in accordance with the present invention. Frame 12 basically includes a first or main frame member 16 and a second or rear frame member 18 with suspension assembly 14 elastically coupling rear frame member 18 to main frame member 16 to absorb shocks transmitted thereto.

Bicycle 10 further includes a rear wheel 19 rotatably coupled about rear hub 19*a,* a front wheel 20 rotatably coupled about front hub 20*a* and a drive train assembly 22 for propelling bicycle 10. Drive train assembly 22 basically includes a bottom bracket 23, a crank set 24 with a front chain ring or sprocket 25, a pair of crank arms 26 with pedals 27, a drive chain 28 and a rear sprocket 29 coupled to rear hub 19*a* of rear wheel 19 in a conventional manner. Since these parts of bicycle 10 are well known in the art, these parts will not be discussed or illustrated in detail herein, except as they are modified to be used in conjunction with the present invention. Moreover, various conventional bicycle parts such as brakes, derailleurs, additional sprocket, etc., which are not illustrated and/or discussed herein, can be used in conjunction with the present invention.

In the embodiment illustrated herein, main frame member 16 is constructed of a plurality of rigid, tubular members, which are fixedly coupled together. Main frame member 16 includes a seat connection 30, a front fork connection 32 and a rear drive train connection 34. Main frame member 16 is preferably constructed from a rigid material such as steel, a chrome molly alloy, a carbon composite material, aluminum or other known suitable framing materials.

Seat connection 30 preferably conventionally couples seat 37 to main frame member 16 via a seat post 38 in a conventional manner. In particular, seat post 38 is preferably telescopically received within the framing tube, which forms seat connection 30. The seat post 38 is held in the desired position by a conventional seat post bolt. Preferably, the seat post bolt is a quick released type bolt. The seat post 38 can be modified to include a seat post suspension assembly 14" in accordance with the present invention. The suspension assembly 14" is substantially identical in construction to rear suspension assembly 14, except for size of the unit and the connections to the frame members and bottom bracket has been modified. Therefore, suspension assembly 14" will not be discussed or illustrated in detail herein. It will be apparent to those skilled in the art that the construction of suspension assembly 14 as described herein applies to the construction of suspension assembly 14" with certain modifications thereto.

Front fork connection 32 preferably telescopically receives both front fork 40 and handlebar stem 42 in a conventional manner. Front fork 40 rotatably supports front wheel 20 via front hub 20*a,* while handlebar stem 42 supports handlebar 46 for pivoting front fork 40 to steer bicycle 10. A handlebar suspension assembly 14' is utilized to elastically connect handlebar 46 (frame member) to handlebar stem 42 (frame member). A suspension assembly 14' is substantially identical in construction to rear suspension assembly 14, except for size of the unit and the connections to the frame members and bottom bracket has been modified. Therefore, suspension assembly 14' will not be discussed or illustrated in detail herein. It will be apparent to those skilled in the art that the construction of suspension assembly 14 as described herein applies to the construction of suspension assembly 14' with certain modifications thereto.

Figure 4:
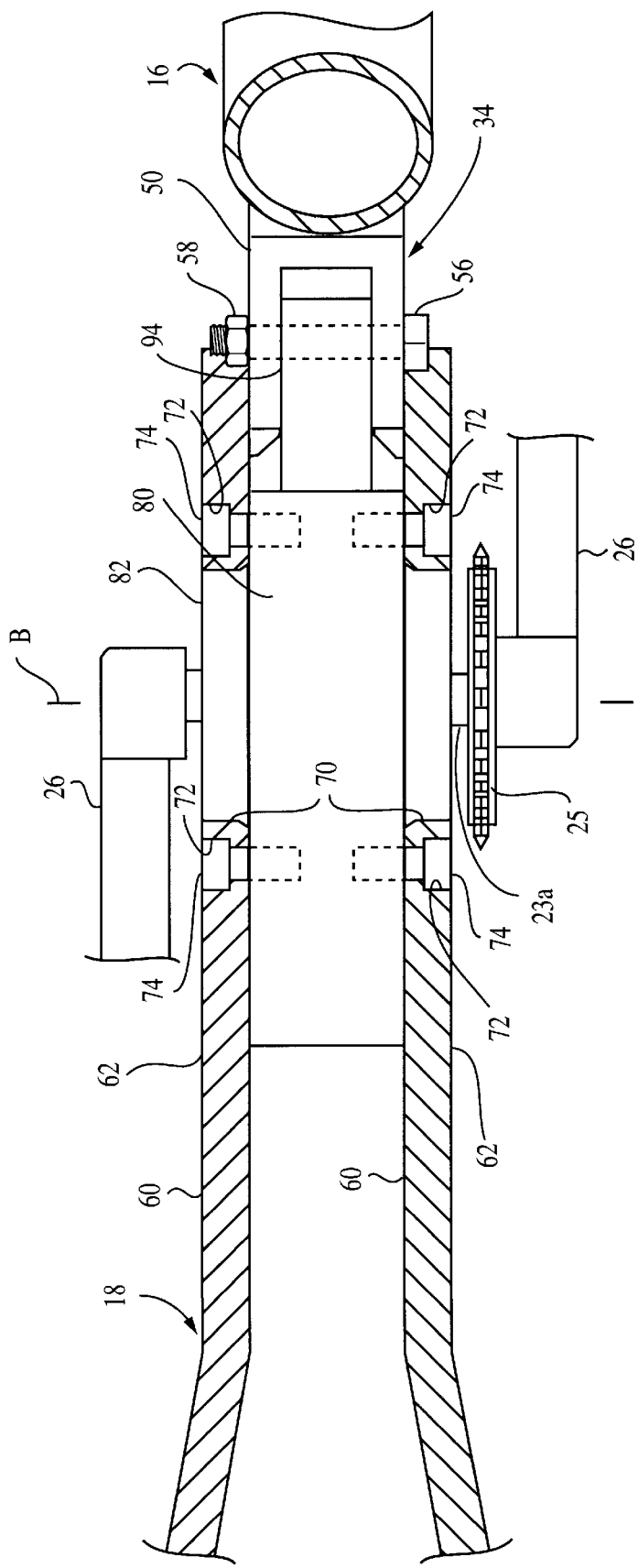
FIG. 4 is a top view of the rear suspension assembly as viewed along the arrow A in FIG. 2 and with the rear frame member being shown in cross-section for purposes of illustration.

As seen in FIG. 4, rear drive train connection 34 is preferably a U-shaped bracket 50 with a pair of mounting flanges. Bracket 50 is welded to one of the tubular members forming main frame member 16. The mounting flanges of bracket 50 extend rearwardly from main frame member 16 and are spaced apart from each other to form a space for receiving a portion of suspension assembly 14 therein. Suspension assembly 14 is designed to be received between the flanges of bracket 50 and then bolted thereto via bolts and nuts. In particular, each of the flanges of bracket 50 has a pair of bolt holes for receiving bolts 56 therethrough. Bolts 56 have threaded free ends, which receive nuts 58 thereon. Accordingly, bolts 56 and its nuts 58 are used to fasten suspension assembly 14 to brackets 50 such that main frame member 16 can be easily disassembled from suspension assembly 14 and rear frame member 18 by merely removing bolts 56 and its nuts 58.

As best seen in FIG. 4, rear frame member 18 includes a pair of substantially identical arms 60. Each arm 60 has a front pivot end 62, which is fixedly coupled to part of bicycle suspension assembly 14, as discussed below, and a rear hub mounting end 64 which is coupled to the rear hub 19a of bicycle wheel 19 such that bicycle wheel 19 can rotate about rear hub 19a between arms 60 of rear frame member 18. Arms 60 are preferably constructed of a rigid material such as aluminum, steel, a chrome molly alloy, a carbon composite material or any other suitable framing type material.

Referring now to FIGS. 1–4 in which the right arm 60 is illustrated. The front pivot end 62 of each arm 60 has a center opening 70 for receiving bottom bracket 23 therethrough, and five bolt holes 72 for receiving bolts 74 to fixedly couple its front pivot end 62 to a part of suspension assembly 14 as discussed below. Rear hub mounting end 64 has a longitudinally extending slot 76, which is designed to receive the threaded posts of the rear hub 19a to fixedly couple rear hub 19a thereto in a conventional manner. Since rear hubs and bicycle wheels such as rear hub 19a and wheel 19 are well known in the art, these parts will not be discussed or illustrated in detail herein.

Figure 3:
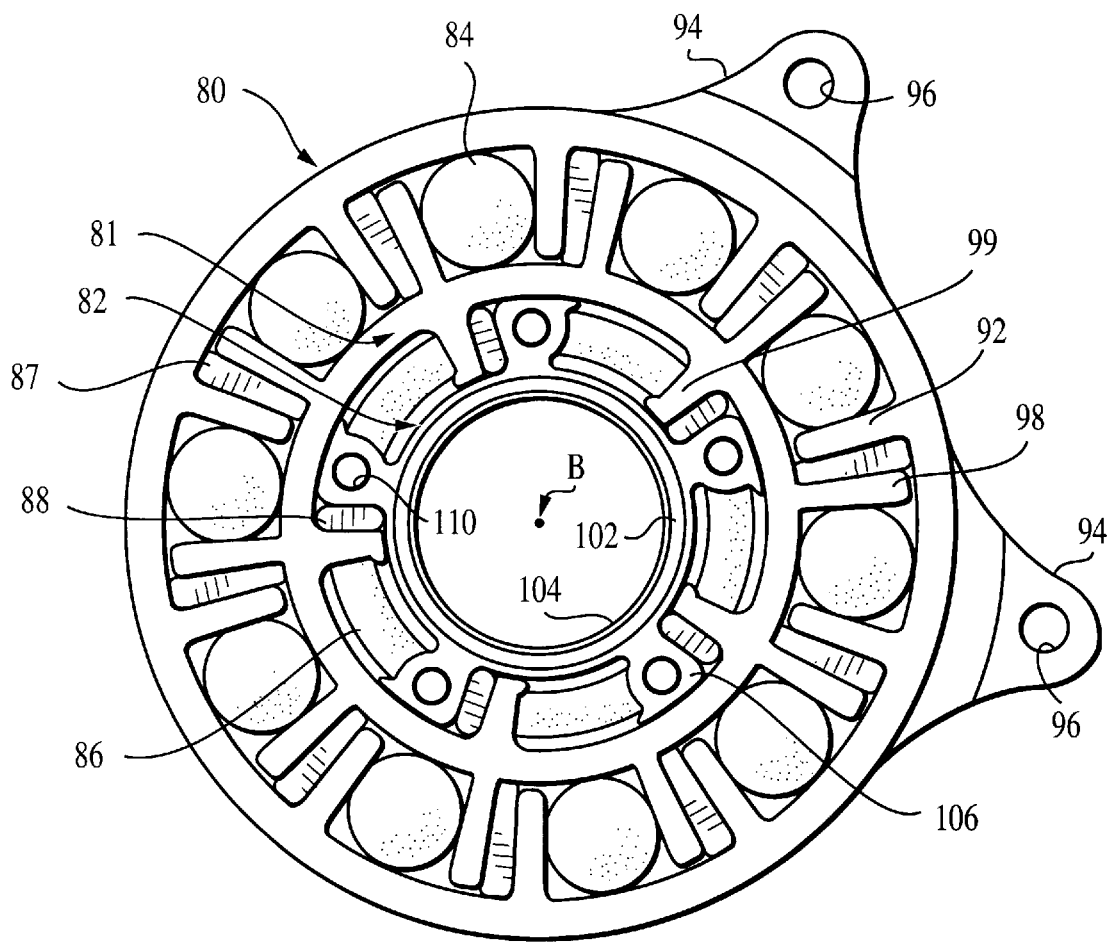
FIG. 3 is a side elevational view of the rear suspension assembly with the bottom bracket removed for purposes of illustration.

Referring now to FIGS. 3–5, suspension assembly 14 basically includes a first or outer suspension member 80, a second or intermediate suspension member 81, a third or inner suspension member 82 and two sets of shock-absorbing elements 84 and 86. Wedges 87 are placed between outer suspension member 80 and intermediate suspension member 81 to preload or slightly compress shock-absorbing elements 84. Similarly, wedges 88 are placed between intermediate suspension member 81 and inner suspension member 82 to preload or slightly compress shock-absorbing elements 86.

Figure 6:
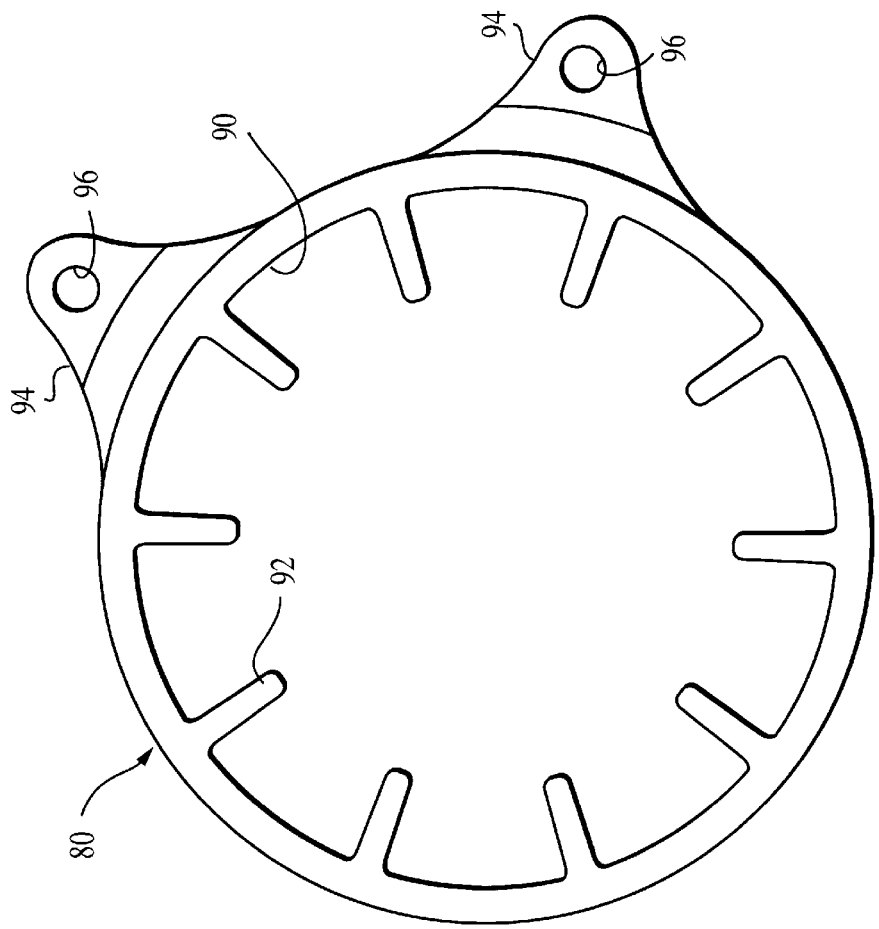
FIG. 6 is a side elevational view of the outer suspension member for the suspension assembly illustrated in FIGS. 1–5.

In the present embodiment, shock-absorbing elements 84 and 86 elastically couple outer suspension member 80 to inner suspension member 82 as best seen in FIGS. 6 and 8. Basically, outer suspension member 80 is rigidly coupled to rear drive train connection 34 of main frame member 16, as seen in FIG. 2. Intermediate suspension member 81 is coaxially mounted between outer suspension member 80 and inner suspension member 82. The first set of shock-absorbing elements 84 are positioned between outer suspension member 80 and intermediate suspension member 81 to elastically couple outer suspension member 80 and intermediate suspension member 81 together. The second set of shock-absorbing elements 86 are positioned between intermediate suspension member 81 and inner suspension member 82 to elastically couple intermediate suspension member 81 and inner suspension member 82 together. Inner suspension member 82 is fixedly coupled to the front pivot ends 62 of arms 60 of rear frame member 18, as seen in FIG. 4. The first and second sets of shock-absorbing elements 84 and 86 allow for relative pivotal movement between outer suspension member 80 and inner suspension member 82 to absorb shocks transmitted to frame 12 from rear wheel 19.

As seen in FIGS. 5 and 6, outer suspension member 80 is constructed of a rigid material such as aluminum, steel, chrome molly alloy or other suitable materials. Outer suspension member 80 has a center opening 90 with its main longitudinal axis extending substantially transverse to the main longitudinal axis of the bicycle frame 12. Opening 90 is designed to receive intermediate suspension member 81 and inner suspension member 82 therein as well as bottom bracket 23 and biasing members 84 and 86, as seen in FIG. 3. Accordingly, the main longitudinal axis of opening 90 is axially aligned with the axis of bottom bracket 23. Opening 90 has ten radially extending flanges or abutment members 92, which extend radially towards the center longitudinal axis of opening 90. These flanges or abutment members 92 each have a pair of oppositely facing abutment surfaces for engaging shock-absorbing elements 84 (biasing members) as mentioned below.

As seen in FIGS. 5 and 6, outer suspension member 80 also has a pair of mounting members 94, with bolt holes 96 extending therethrough. Mounting members 94 form a main frame mounting connection for coupling suspension assembly 14 to main frame member 16 via bolts 56 and its nuts. In particular, bolts 56 are inserted through bolt holes 54 of one of the brackets 50, and then through bolt holes 96 of outer suspension member 80, and then finally through the other two bolt holes 54 in the other of the two brackets 50. Finally, the nuts are threaded onto the threaded free ends of bolts 56 to fixedly secure outer suspension member 80 to main frame member 16.

Figure 7:
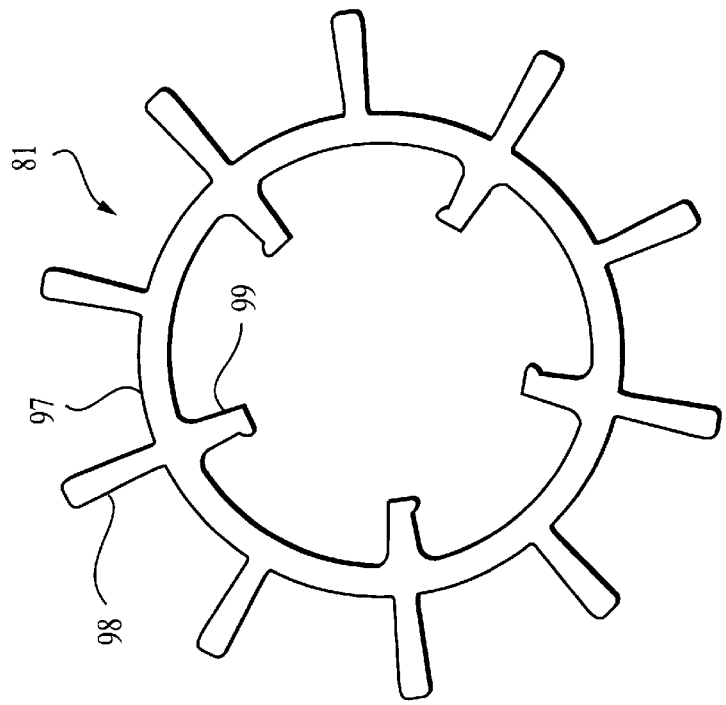
FIG. 7 is a side elevational view of the intermediate suspension member for the suspension assembly illustrated in FIGS. 1–5.

As seen in FIG. 7, intermediate suspension member 81 is constructed of a rigid material such as aluminum, steel, chrome molly alloy or other suitable materials. Intermediate suspension member 81 has a tubular portion 97 with ten flanges or abutment members 98 extending radially outwardly from tubular portion 97 and five flanges or abutment members 99 extending radially inwardly from tubular portion 97. Tubular portion 97 has its main longitudinal axis extending substantially transverse to the main longitudinal axis of the bicycle frame 12 and being coaxially arranged with the center axes of outer suspension member 80 and inner suspension member 82. The ten outwardly extending flanges or abutment members 98 each have a pair of oppositely facing abutment surfaces for engaging shock-absorbing elements 84 (biasing members). The five inwardly extending flanges or abutment members 99, on the other hand each have a pair of oppositely facing abutment surfaces for engaging shock-absorbing elements 86 (biasing members). Accordingly, the shock due to the movement of rear wheel 19 is absorbed by elastic deformation of shock-absorbing elements 84 and 86 during relative rotation of inner and intermediate members 81 and 82 relative to outer suspension member 80.

Referring now to FIGS. 3 and 8–10, second or inner suspension member 82 is constructed of a rigid material such as aluminum, steel, chrome molly alloy or other suitable materials. Inner suspension member 82 has a hub portion 102 with a center bore 104 extending therethrough and five flanges or abutment members 106 extending radially outwardly from hub portion 102. Center bore 104 is preferably sized to receive bottom bracket 23 therein in a conventional manner. In particular, each end of center bore 104 has threads 108 for threadedly receiving bottom bracket 23. Of course, it will be apparent to those skilled in the art that center bore 104 can be of other types of constructions for other types of bottom brackets or members which will rotatably support the bicycle crank axle 23a therein.

As best seen in FIG. 3, inner suspension member 82 is received within the center opening of intermediate suspension member 81 such that flanges 106 of inner suspension member 82 is positioned between flanges 99 of intermediate suspension member 81 with shock-absorbing elements or biasing members 86 interposed between adjacent flanges 99 and 106. The flanges or abutments 106 preferably have a pair of oppositely facing abutment surfaces for engaging shock-absorbing elements or biasing members 86 when inner suspension member 82 is positioned within the center opening of intermediate suspension member 81. Each of the flanges 106 has a threaded hole 110 for receiving bolts 74 to fixedly couple arms 60 to each side of inner suspension member 82. Since inner suspension member 82 is fixedly coupled to arms 60 of rear frame member 18, inner suspension member 82 and rear frame member 18 will move together relative to main frame member 16 and outer suspension member 80 which are fixedly coupled together as mentioned above. Of course, the amount of rotational or pivotal movement between outer suspension member 80 and inner suspension member 82 is limited by the compression of biasing members 84 and 86.

Shock-absorbing elements or biasing members 84 and 86 are preferably elastomeric members, which are sized and shaped to be received between outer suspension member 80, intermediate suspension member 81 and inner suspension member 82. Each of the shock-absorbing elements 84 and 86 can be constructed as a solid one-piece member from a single resilient material as seen in FIG. 3. Alternatively, shock-absorbing elements 84 and 86 can be constructed as from several resilient and/or compressible materials. Examples of suitable materials for shock-absorbing elements 84 and 86 include solid elastomeric such as urethane, or an elastomeric sponge material covered by a gas impermeable elastomeric shell, or a gas impermeable elastomeric shell filled with a compressible fluid.

As seen in FIG. 11, one of the shock-absorbing elements 84 is illustrated as having an outer portion 84a constructed of a gas impermeable elastomeric material and a hollow portion 84b completely surrounded by outer portion 84a. Hollow portion 84b can be filled with a fluid such as compressed air or other suitable fluids. Alternatively, hollow portion 84b can be filled with a compressible material such as a sponge material as seen in FIG. 12. In either of the examples of FIGS. 11 and 12, outer portion 84a seals the air or fluid therein. By using shock-absorbing elements 84 as seen in FIGS. 11 and/or 12, the shock-absorbing elements is less likely to be permanently fatigued with high compression rate use therefor. Unless the air inside of the shock-absorbing elements 84 as seen in FIGS. 11 and/or 12 leaks, the spring constant is small and there is no permanent fatigue.

The outer shock-absorbing elements or biasing members 84 are constructed of a softer material or lower spring rate than the inner shock-absorbing elements or biasing members 86. Therefore, shock-absorbing elements or biasing members 84 and 86 are compressed in series. More specifically, when rear wheel 19 hits a bump, rear frame member 18 initially causes inner suspension member 82 to rotate relative to main frame member 16. This initial rotation of inner suspension member 82 causes inner shock-absorbing elements 86 and intermediate suspension member 81 to rotate therewith without any substantially compression of inner shock-absorbing elements 86. The outer shock-absorbing elements or biasing members 84, on the other hand, are compressed between outer suspension member 80 and intermediate suspension member 81. If the force applied to inner suspension member 82 is large, inner shock-absorbing elements 86 will be compressed after a predetermined amount of compression has occurred in outer shock-absorbing elements 84. The use of soft outer shock-absorbing elements 84 and hard inner shock-absorbing elements 86 results in a suspension assembly having a longer stroke (distance of travel of rear wheel 19) with lower force. Of course, the force per unit of travel depends on the hardness of shock-absorbing elements 84 and 86. Moreover, the stiffness of the suspension assembly can also be varied by changing the number of shock-absorbing elements 84 and 86 being utilized.

Referring again to FIGS. 6 and 11, shock-absorbing elements or biasing members 84 are preferably elastomeric members, which are sized and shaped to be received between flanges 92 of outer suspension member 80 and flanges 98 of intermediate suspension member 81. Wedges 87 are inserted between flanges 92 and 98 to preload biasing members 84 such that no relative movement occurs between outer suspension member 80 and intermediate suspension member 81 without biasing members 84 being further deformed. During normal use, biasing members 84 should have sufficient resiliency to be elastically deformed to absorb shocks transmitted to frame 12 and to spring back to their normal rest positions. As seen in FIG. 3, biasing members 84 are substantially cylindrical members having a circular cross-section. Of course, biasing members 84 can have a wide variety of shapes depending on the shapes of the other components of suspension assembly 14. Preferably, biasing members 84 are sized such that they are slightly deformed in their rest positions to prevent any relative movement between outer suspension member 80 and intermediate suspension member 81. While ten biasing members 84 are used to form the shock-absorbing element of the illustrated embodiment, it will be apparent to those skilled in the art from this disclosure that the shock-absorbing element could be constructed of a single elastomeric element, a single spring, a plurality of springs, etc. In other words, it will be apparent to those skilled in the art that the appended claims should not be limited to the shock-absorbing element illustrated herein.

Referring again to FIGS. 3 and 8, shock-absorbing elements or biasing members 86 are preferably elastomeric members, which are sized and shaped to be received between flanges 99 of intermediate suspension member 81 and flanges 106 of inner suspension member 82. Wedges 88 are inserted between flanges 99 and 106 to preload biasing members 86 such that no relative movement occurs between intermediate suspension member 81 and inner suspension member 82 without biasing members 86 being deformed. During normal use, biasing members 86 should have sufficient resiliency to be elastically deformed to absorb shocks transmitted to framed 12 and to spring back to their normal rest positions. As seen in FIG. 3, biasing members 86 are curved block shaped members with a somewhat distorted rectangular cross-section. Of course, biasing members 86 can have a wide variety of shapes depending on the shapes of the other components of suspension assembly 14. Preferably, biasing members 86 are sized such that they are slightly deformed in their rest positions to prevent any relative movement between intermediate suspension member 81 and inner suspension member 82. While a plurality of biasing members 86 are used to form the shock-absorbing element of the illustrated embodiment, it will be apparent to those skilled the in the art from this disclosure that the shock-absorbing element could be constructed of a single elastomeric element, a single spring, a plurality of springs, etc. In other words, it will be apparent to those skilled in the art that the appended claims should not be limited to the shock-absorbing element illustrated herein.

As seen in FIG. 3, a first set of spacing members or wedges 87 are located between flanges 92 of outer suspension member 80 and flanges 98 of intermediate suspension member 81, and a second set of spacing members or wedges 88 are located between flanges 99 of intermediate suspension member 81 and flanges 106 of inner suspension member 82. These spacing members or wedges 87 and 88 are designed to preloaded shock-absorbing elements 84 and 86, respectively, to their maximum preload value as provided by the illustrated embodiment. Of course, it will be apparent to those skilled in the art from this disclosure that shock-absorbing elements 84 and 86 do need to be preloaded by spacing members 87 and 88. Preferably, wedges 87 and 88 are hard, rigid members.

In operation, when a force or a shock is transmitted to the rear wheel 19, rear frame member 18 together with inner suspension member 82 will rotate in a clockwise direction about the main axis of bottom bracket 23. Since the absorption of this force or shock is compensated for by rotation about the axis of bottom bracket 23, there will be no affect on the chain 28. In other words, the chain 28 will not loosen or tighten during the rotational movement of the rear frame member 18 with respect to the main frame member 16. During this absorption of the shock or force to the bicycle 10, shock-absorbing elements or biasing members 84 and/or 86 will be elastically deformed or compressed between outer and inner suspension members 80 and 82 via intermediate suspension member 81.

Since outer shock-absorbing elements 84 are constructed of a softer material than the inner shock-absorbing elements 86, shock-absorbing elements 84 and 86 are compressed in series. More specifically, when rear wheel 19 hits a bump, rear frame member 18 initially causes inner suspension member 82 to rotate relative to main frame member 16. This initial rotation of inner suspension member 82 causes inner shock-absorbing elements 86 and intermediate suspension member 81 to rotate therewith without any substantially compression of inner shock-absorbing elements 86. The outer shock-absorbing elements or biasing members 84, on the other hand, are compressed between outer suspension member 80 and intermediate suspension member 81. If the force applied to inner suspension member 82 is large, inner shock-absorbing elements 86 will be compressed after a predetermined amount of compression has occurred in outer shock-absorbing elements 84.

Once the force or shock on the frame 12 is relieved, shock-absorbing elements 84 and/or 86 will spring back to their rest positions, which in turn will rotate inner suspension member 82 relative to outer suspension member 80, due to the resiliency of shock-absorbing elements 84 and 86. In their initial rest positions, shock-absorbing elements 84 and 86 can be initially compressed or preloaded by spacing members or wedges 87 and 88.

It is important to set a proper spring constant (stroke amount) of shock-absorbing elements 84 and 86 to make a bicycle easy to ride. To mitigate the impact from rough roads, the spring constant should be small to produce a long stroke. In other words, the smaller the spring constant of shock-absorbing elements 84 and 86 is the longer the stroke. In the suspension assembly 14, the rotational angle of the unit corresponds directly to the stroke or the amount of movement of wheel 19. When the shock-absorbing elements 84 and 86 of the suspension assembly 14 are compressed in a tangential direction, the compression angle of the shock-absorbing elements 84 and 86 are the same as the rotational angle of the unit. Therefore, to increase the rotational angle of the suspension assembly 14, the elasticity of the shock-absorbing elements 84 and 86 have to be increased. However, if the shock-absorbing elements have high elasticities, repeated deformation may result in "permanent fatigue" of the shock-absorbing elements 84 and 86. Also shock-absorbing elements with high elasticities are not good for a bicycle suspension because a shear and a slip may occur due to rolling compression and compression in a non-tangential direction. Accordingly, one object of the suspension assembly 14 is to lengthen the stroke (e.g. make the spring constant smaller) without increasing the elasticity of the shock-absorbing elements 84 and 86. Of course, the force per unit of travel depends on the hardness of shock-absorbing elements 84 and 86. Accordingly, changing the number and/or the hardness of shock-absorbing elements 84 and 86 can vary the stiffness of the suspension assembly 14.

Suspension assembly 14 has shock-absorbing elements 84 and 86 positioned between outer suspension member 80, intermediate suspension member 81 and inner suspension member 82. This arrangement of the shock-absorbing elements 84 and 86 is tantamount to placing the shock-absorbing elements 84 and 86 in a row and compressing them. This way, the spring constant of the whole suspension assembly 14 can be made smaller using the same shock-absorbing elements 84 and 86. It is also possible to keep the stroke constant by lowering the elasticity of the shock-absorbing elements 84 and 86 (i.e. using a hard elastomeric material), thereby avoiding permanent fatigue of the shock-absorbing elements 84 and 86.

By using outer shock-absorbing elements 84 and inner shock-absorbing elements 86 in series instead of one or a single set of shock-absorbing elements, suspension assembly 14 provides a longer stroke suspension for a more comfortable ride and produces less elastic deformation for longer durability. To explain this phenomenon, three examples of suspension assemblies will be compared. In the first exemplary suspension, a single shock-absorbing element (elastomeric member, spring, or other elastic member) is used. In the second exemplary suspension, first and second shock-absorbing elements (elastomeric members, springs, or other elastic members) from the first exemplary suspension are used in series. In the third exemplary suspension, first and second shock-absorbing elements (elastomeric members, springs, or other elastic members) are used in series that are harder or stiffer than those of the second exemplary suspension. In each case, the first and/or second shock-absorbing elements can be constructed of one or more shock-absorbing members arranged in parallel.

In the first exemplary suspension, if a predetermined force or shock (F1) acts on the shock-absorbing element, a predetermined amount of elastic deformation occurs that results in a stroke with a length (L1). However, in the second exemplary suspension, if the same predetermined force or shock (F1) acts on two of the same shock-absorbing elements that are arranged in series, the amount of elastic deformation occurring results in a stroke with a length (L2) that is twice that of the first exemplary suspension. In another words, in this second exemplary suspension, each shock-absorbing element is elastically deformed by the length (L1) such that the combined stroke is twice the length of L1. Accordingly, the second exemplary suspension results in a suspension assembly that has twice the stroke as the first exemplary suspension, when the same amount of force or shock is supplied thereto. Accordingly, the second exemplary suspension will provide the rider with a more comfortable ride.

In order to increase the durability of the shock-absorbing elements the amount of elastic deformation occurring in the shock-absorbing elements should be reduced. This is accomplished by utilizing harder shock-absorbing elements in series as in the third exemplary suspension. In the third exemplary suspension, one or both of the shock-absorbing elements are harder shock-absorbing elements than in the second exemplary suspension. In this third exemplary suspension, a longer stroke is still obtained over the first exemplary suspension. In particular, each set of shock-absorbing elements will be elastically deformed such that the sum of the elastic deformation of the two sets of shock-absorbing elements is greater than the first predetermined amount of elastic deformation in the first exemplary suspension. Of course, by utilizing harder shock-absorbing elements in the third exemplary suspension, the stroke will be somewhat shorter than the second exemplary suspension.

Of course, it would be apparent to those skilled in the art from this disclosure that the stiffness or hardness of the shock-absorbing elements 84 and 86 can be changed relative to each other to adjust the length of the stroke as well as durability of the suspension assembly 14. In other words, the harder or stiffer the shock-absorbing elements, the shorter stroke. Conversely, the softer the shock-absorbing element 84 and 86, the longer stroke. It would be apparent to those skilled in the art from this disclosure that outer shock-absorbing elements 84 and either shock-absorbing element 86 can have the same stiffness or different stiffness.

The use of outer shock-absorbing elements 84 and inner shock-absorbing elements 86 results in suspension assembly 14 having a longer stroke (distance of travel of rear wheel 19) and being more durable. It will be apparent to those skilled in the art from this disclosure that the stiffness of the suspension assemblies 14, 14' and 14" of the present invention can be adjusted by changing the number of flanges of the suspension members 80, 81 and 82 and the number of shock-absorbing elements 84 and 86. Also it will be apparent to those skilled in the art from this disclosure that the stiffness of the suspension assemblies 14, 14' and 14" of the present invention can be adjusted by changing the elastic or compressive properties of shock-absorbing elements 84 and 86.

While only one embodiment of the present invention has been described and illustrated in detail herein, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A bicycle suspension assembly, comprising:
   a first suspension member having a first frame connection to be coupled to a first bicycle frame member and including at least one first abutment;
   a second suspension member movably coupled to said first suspension member for relative pivotal movement about a pivot axis, said second suspension member including at least one second abutment and having a second frame connection to fixedly couple a second bicycle frame member thereto and a bore sized to receive a bicycle crank axle therein such that said bicycle crank axle has its axis of rotation substantially coincident with said pivot axis;
   an intermediate suspension member movably positioned between said first and second suspension members for relative movement, said intermediate suspension member including at least one third abutment and at least one fourth abutment, said third and fourth abutments overlapping with said first abutment of said first suspension member and said second abutment of said second suspension member in a circumferential direction;
   a first shock-absorbing element coupled between said first suspension member and said intermediate suspension member and functionally engaging said first and third abutments to bias said second suspension member from a first shock-absorbing position in which said first shock-absorbing element is substantially elastically deformed to a first rest position in which said first shock-absorbing element is in relative equilibrium; and
   a second shock-absorbing element coupled between said second suspension member and said intermediate suspension member and functionally engaging said second and fourth abutments to bias said second suspension member from a second shock-absorbing position in which said second shock-absorbing element is substantially elastically deformed to a second rest position in which said second shock-absorbing element is in relative equilibrium.

2. A bicycle suspension assembly according to claim 1, wherein
   said first suspension member has an opening with said second suspension member coaxially located therein for relative rotation about said pivot axis.

3. A bicycle suspension assembly according to claim 2, wherein
   said shock-absorbing element is located within said opening.

4. A bicycle suspension assembly according to claim 2, wherein
   said first suspension member has first abutments extending inwardly into said opening, said second suspension member has second abutments extending outwardly therefrom, said intermediate suspension member includes third abutments extending outwardly therefrom and fourth abutments extending inwardly therefrom, said first shock-absorbing element includes a plurality of first biasing members positioned between said first and third abutments to normally hold said first and intermediate suspension members from moving until a torsional force is applied causing at least one of said first biasing members to elastically deform, and said second shock-absorbing element includes a plurality of second biasing members positioned between said second and fourth abutments to normally hold said second and intermediate suspension members from moving until a torsional force is applied causing at least one of said second biasing members to elastically deform.

5. A bicycle suspension assembly according to claim 4, wherein
said first suspension member includes ten of said first abutments and said intermediate suspension member includes ten of said third abutments, with one of said first biasing members positioned between opposing surfaces of said first and third abutments.

6. A bicycle suspension assembly according to claim 5, wherein
said second suspension member includes five of said second abutments and said intermediate suspension member includes five of said fourth abutments, with one of said second biasing members positioned between opposing surfaces of said second and fourth abutments.

7. A bicycle suspension assembly according to claim 4, wherein
said first and third abutments of said first suspension member and said intermediate suspension member, respectively, are twice in number as said second and fourth abutments of said second suspension member and said intermediate suspension member.

8. A bicycle suspension assembly according to claim 1, wherein
said first and second shock-absorbing elements being constructed of an elastomeric material.

9. A bicycle suspension assembly according to claim 1, wherein
said first and second shock-absorbing elements have hollow portions.

10. A bicycle suspension assembly according to claim 9, wherein
said hollow portions of said first and second shock-absorbing elements are filled with a fluid.

11. A bicycle suspension assembly according to claim 9, wherein
said hollow portions of said first and second shock-absorbing elements are filled with a sponge material.

12. A bicycle suspension assembly according to claim 1, wherein
said first and second shock-absorbing elements have an inner portion constructed of a first material and an outer portion constructed of second material with different elastic properties from said inner portion.

13. A bicycle suspension assembly according to claim 1, wherein
said bore of said second suspension member is threaded to couple a bicycle bottom bracket therein to rotatably support the bicycle crank axle.

14. A bicycle frame, comprising:
a first bicycle frame member having a front pivot end and a rear hub mounting end; and
a bicycle suspension assembly coupled to said front pivot end of said first bicycle frame member via a first frame connection, said bicycle suspension assembly including
a first suspension member having a second frame connection to be fixedly coupled to a second bicycle frame member and including at least one first abutment,
a second suspension member fixedly coupled to said front pivot end of said first bicycle frame member for movement therewith about a pivot axis and movably coupled to said first suspension member for relative pivotal movement about said pivot axis, said second suspension member including at least one second abutment and having a bore sized to receive a bicycle crank axle therein such that said bicycle crank axle has its axis of rotation substantially coincident with said pivot axis,
an intermediate suspension member movably positioned between said first and second suspension members for relative movement, said intermediate suspension member including at least one third abutment and at least one fourth abutment, said third and fourth abutments overlapping with said first abutment of said first suspension member and said second abutment of said second suspension member in a circumferential direction,
a first shock-absorbing element coupled between said first suspension member and said intermediate suspension member and functionally engaging said first and third abutments to bias said second suspension member about said pivot axis from a first shock-absorbing position in which said first shock-absorbing element is substantially elastically deformed to a first rest position in which said first shock-absorbing element is in relative equilibrium, and
a second shock-absorbing element coupled between said second suspension member and said intermediate suspension member and functionally engaging said second and fourth abutments to bias said second suspension member about said pivot axis from a second shock-absorbing position in which said second shock-absorbing element is substantially elastically deformed to a second rest position in which said second shock-absorbing element is in relative equilibrium.

15. A bicycle frame according to claim 14, wherein
said first suspension member has an opening with said second suspension member coaxially located therein for relative rotation about said pivot axis.

16. A bicycle frame according to claim 15, wherein
said shock-absorbing element is located within said opening.

17. A bicycle frame according to claim 15, wherein
said first suspension member has first abutments extending inwardly into said opening, said second suspension member has second abutments extending outwardly therefrom, said intermediate suspension member includes third abutments extending outwardly therefrom and fourth abutments extending inwardly therefrom, said first shock-absorbing element includes a plurality of first biasing members positioned between said first and third abutments to normally hold said first and intermediate suspension members from moving until a torsional force is applied causing at least one of said first biasing members to elastically deform, and said second shock-absorbing element includes a plurality of second biasing members positioned between said second and fourth abutments to normally hold said second and intermediate suspension members from moving until a torsional force is applied causing at least one of said second biasing members to elastically deform.

18. A bicycle frame according to claim 17, wherein
said first suspension member includes ten of said first abutments and said intermediate suspension member includes ten of said third abutments, with one of said first biasing members positioned between opposing surfaces of said first and third abutments.

19. A bicycle frame according to claim 18, wherein
said second suspension member includes five of said second abutments and said intermediate suspension member includes five of said fourth abutments, with one of said second biasing members positioned between opposing surfaces of said second and fourth abutments.

20. A bicycle frame according to claim 14, wherein
said first and second shock-absorbing elements being constructed of an elastomeric material.

21. A bicycle frame according to claim 14, wherein
said first and second shock-absorbing elements have hollow portions.

22. A bicycle frame according to claim 14, wherein
said bore of said second suspension member is threaded to couple a bicycle bottom bracket therein to rotatably support the bicycle crank axle.

23. A bicycle frame according to claim 14, wherein
said first and second shock-absorbing elements have an inner portion constructed of a first material and an outer portion constructed of second material with different elastic properties from said inner portion.

24. A bicycle frame according to claim 21, wherein
said hollow portions of said first and second shock-absorbing elements are filled with a fluid.

25. A bicycle frame according to claim 21, wherein
said hollow portions of said first and second shock-absorbing elements are filled with a sponge material.

26. A bicycle frame, comprising:
a first bicycle frame member having a fork connection and a drive train connection;
a second bicycle frame member having a front pivot end and a rear hub mounting end; and
a bicycle suspension assembly coupled to said drive train connection of said first bicycle frame member and coupled to said front pivot end of said second bicycle frame member, said bicycle suspension assembly including
   a first suspension member having a first frame connection to be fixedly coupled to said drive train connection of said first bicycle frame member and including at least one first abutment,
   a second suspension member fixedly coupled to said front pivot end of said second bicycle frame member for movement therewith about a pivot axis and movably coupled to said first suspension member for relative rotational movement about said pivot axis, said second suspension member including at least one second abutment and having a bore sized to receive a bicycle crank axle therein such that said bicycle crank axle has its axis of rotation substantially coincident with said pivot axis,
   an intermediate suspension member movably positioned between said first and second suspension members for relative movement, said intermediate suspension member including at least one third abutment and at least one fourth abutment, said third and fourth abutments overlapping with said first abutment of said first suspension member and second abutment of said second suspension member in a circumferential direction,
   a first shock-absorbing element coupled between said first suspension member and said intermediate suspension member and functionally engaging said first and third abutments to bias said second suspension member from a first shock-absorbing position in which said first shock-absorbing element is substantially elastically deformed to a first rest position in which said first shock-absorbing element is in relative equilibrium, and
   a second shock-absorbing element coupled between said second suspension member and said intermediate suspension member and functionally engaging said second and fourth abutments to bias said second suspension member from a second shock-absorbing position in which said second shock-absorbing element is substantially elastically deformed to a second rest position in which said second shock-absorbing element is in relative equilibrium.

27. A bicycle frame according to claim 26, wherein
said first suspension member has an opening with said second suspension member coaxially located therein for relative rotation about said pivot axis.

28. A bicycle frame according to claim 27, wherein
said shock-absorbing element is located within said opening.

29. A bicycle frame according to claim 27, wherein
said first suspension member has first abutments extending inwardly into said opening, said second suspension member has second abutments extending outwardly therefrom, said intermediate suspension member includes third abutments extending outwardly therefrom and fourth abutments extending inwardly therefrom, said first shock-absorbing element includes a plurality of first biasing members positioned between said first and third abutments to normally hold said first and intermediate suspension members from moving until a torsional force is applied causing at least one of said first biasing members to elastically deform, and said second shock-absorbing element includes a plurality of second biasing members positioned between said second and fourth abutments to normally hold said second and intermediate suspension members from moving until a torsional force is applied causing at least one of said second biasing members to elastically deform.

30. A bicycle frame according to claim 29, wherein
said first suspension member includes ten of said first abutments and said intermediate suspension member includes ten of said third abutments, with one of said first biasing members positioned between opposing surfaces of said first and third abutments.

31. A bicycle frame according to claim 30, wherein
said second suspension member includes five of said second abutments and said intermediate suspension member includes five of said fourth abutments, with one of said second biasing members positioned between opposing surfaces of said second and fourth abutments.

32. A bicycle frame according to claim 26, wherein
said first and second shock-absorbing elements being constructed of an elastomeric material.

33. A bicycle frame according to claim 26, wherein
said first and second shock-absorbing elements have hollow portions.

34. A bicycle frame according to claim 26, wherein
said bore of said second suspension member is threaded to couple a bicycle bottom bracket therein to rotatably support the bicycle crank axle.

35. A bicycle frame according to claim 33, wherein
said first and second shock-absorbing elements have an inner portion constructed of a first material and an outer portion constructed of second material with different elastic properties from said inner portion.

36. A bicycle frame according to claim 33, wherein said hollow portions of said first and second shock-absorbing elements are filled with a fluid.

37. A bicycle frame according to claim 35, wherein said hollow portions of said first and second shock-absorbing elements are filled with a sponge material.

38. A bicycle suspension assembly adapted to be coupled between a first bicycle frame member and a second bicycle frame member, said bicycle suspension assembly comprising:

a first suspension member having a first frame connection to be fixedly coupled to the first bicycle frame member and including at least one first abutment;

a second suspension member having a second frame connection to be fixedly coupled to the second bicycle frame member for movement therewith about a pivot axis and movably coupled to said first suspension member for relative rotational movement about said pivot axis, said second suspension member including at least one second abutment and having a bore sized to receive said first suspension member therein;

an intermediate suspension member movably positioned in said bore between said first and second suspension members for relative movement, said intermediate suspension member including at least one third abutment and at least one fourth abutment, said third and fourth abutments overlapping with said first abutment of said first suspension member and said second abutment of said second suspension member in a circumferential direction;

a first shock-absorbing element coupled between said first suspension member and said intermediate suspension member and functionally engaging said first and third abutments to bias said second suspension member about said pivot axis from a first shock-absorbing position in which said first shock-absorbing element is substantially elastically deformed to a first rest position in which said first shock-absorbing element is in relative equilibrium; and a second shock-absorbing element coupled between said second suspension member and said intermediate suspension member and functionally engaging said second and fourth abutments to bias said second suspension member about said pivot axis from a second shock-absorbing position in which said second shock-absorbing element is substantially elastically deformed to a second rest position in which said second shock-absorbing element is in relative equilibrium.

39. A bicycle suspension assembly according to claim 38, wherein said first suspension member has an opening with said second suspension member coaxially located therein for relative rotation about said pivot axis.

40. A bicycle suspension assembly according to claim 39, wherein said shock-absorbing element is located within said opening.

41. A bicycle suspension assembly according to claim 39, wherein said first suspension member has first abutments extending inwardly into said opening, said second suspension member has second abutments extending outwardly therefrom, said intermediate suspension member includes third abutments extending outwardly therefrom and fourth abutments extending inwardly therefrom, said first shock-absorbing element includes a plurality of first biasing members positioned between said first and third abutments to normally hold said first and intermediate suspension members from moving until a torsional force is applied causing at least one of said first biasing members to elastically deform, and said second shock-absorbing element includes a plurality of second biasing members positioned between said second and fourth abutments to normally hold said second and intermediate suspension members from moving until a torsional force is applied causing at least one of said second biasing members to elastically deform.

42. A bicycle suspension assembly according to claim 41, wherein said first suspension member includes ten of said first abutments and said intermediate suspension member includes ten of said third abutments, with one of said first biasing members positioned between opposing surfaces of said first and third abutments.

43. A bicycle suspension assembly according to claim 42, wherein said second suspension member includes five of said second abutments and said intermediate suspension member includes five of said fourth abutments, with one of said second biasing members positioned between opposing surfaces of said second and fourth abutments.

44. A bicycle suspension assembly according to claim 41, wherein said first and third abutments of said first suspension member and said intermediate suspension member, respectively, are twice in number as said second and fourth abutments of said second suspension member and said intermediate suspension member.

45. A bicycle suspension assembly according to claim 38, wherein said first and second shock-absorbing elements being constructed of an elastomeric material.

46. A bicycle suspension assembly according to claim 38, wherein said first and second shock-absorbing elements have hollow portions.

47. A bicycle suspension assembly according to claim 46, wherein said hollow portions of said first and second shock-absorbing elements are filled with a fluid.

48. A bicycle suspension assembly according to claim 46, wherein said hollow portions of said first and second shock-absorbing elements are filled with a sponge material.

49. A bicycle suspension assembly according to claim 38, wherein said first and second shock-absorbing elements have an inner portion constructed of a first material and an outer portion constructed of second material with different elastic properties from said inner portion.

* * * * *